United States Patent [19]
Nishikawa

[11] Patent Number: 5,671,199
[45] Date of Patent: Sep. 23, 1997

[54] DETECTING APPARATUS FOR DETECTING A TRACKING ERROR SIGNAL IN AN OPTICAL INFORMATION RECORDING AND/OR REPRODUCING APPARATUS AND AN OPTICAL INFORMATION RECORDING AND/OR REPRODUCING APPARATUS

[75] Inventor: Koichiro Nishikawa, Takasaki, Japan

[73] Assignee: Canon Kabushiki Kaishi, Tokyo, Japan

[21] Appl. No.: 533,275

[22] Filed: Sep. 25, 1995

[30] Foreign Application Priority Data

Sep. 27, 1994 [JP] Japan ..................... 6-231287

[51] Int. Cl.⁶ ................................ G11B 7/085
[52] U.S. Cl. .................... 369/44.26; 369/44.37; 369/58
[58] Field of Search .............. 369/44.37, 44.38, 369/44.26, 44.34, 44.41, 112, 103, 111, 109, 54, 58; 250/201.5

[56] References Cited

U.S. PATENT DOCUMENTS

| | | | |
|---|---|---|---|
| 5,130,965 | 7/1992 | Karaki et al. | 369/44.38 |
| 5,138,592 | 8/1992 | Fujita | 369/44.37 |
| 5,166,921 | 11/1992 | Matsui | 369/44.34 |
| 5,363,358 | 11/1994 | Yanagawa | 369/44.29 |

FOREIGN PATENT DOCUMENTS

| | | |
|---|---|---|
| 0216341 | 4/1987 | European Pat. Off. . |
| 3533647 | 3/1986 | Germany . |
| 4-34212 | 6/1992 | Japan . |
| 2166583 | 5/1986 | United Kingdom . |

OTHER PUBLICATIONS

"Introduction to Video Discs and Digital Audio Disks for Beginner's" Kabushiki Kaisha Corona Sha. (1st Ed. Nov. 1, 1982), pp. 132–141.

"Simplified Diffraction Theory Of The Video Disk", A. Korpel, Applied Optics, vol. 17, No. 13, pp. 2037–2096 (Jul. 1, 1978).

Primary Examiner—Thang V. Tran
Attorney, Agent, or Firm—Fitzpatrick, Cella, Harper & Scinto

[57] ABSTRACT

An optical information recording and/or reproducing apparatus has a detecting apparatus for detecting a tracking error signal. The detecting apparatus includes a spot forming system for forming three spots of a main spot, a first subspot, and a second subspot on an optical information recording medium, a light-receiving system for receiving reflected light from the three spots through light-receiving elements corresponding to the respective spots, a first detecting system for detecting a tracking error signal, using an output from the light-receiving element corresponding to the main spot or using outputs from the light-receiving elements corresponding to the main spot, the first subspot, and the second subspot, if there are tracking guide grooves in the optical information recording medium, and a second detecting system for detecting a tracking error signal, using an output from the light-receiving element corresponding to the first subspot and an output from the light-receiving element corresponding to the second subspot, if there is no tracking guide groove in the optical information recording medium.

8 Claims, 6 Drawing Sheets

DETECTING APPARATUS FOR DETECTING A TRACKING ERROR SIGNAL IN AN OPTICAL INFORMATION RECORDING AND/OR REPRODUCING APPARATUS AND AN OPTICAL INFORMATION RECORDING AND/OR REPRODUCING APPARATUS

BACKGROUND OF THE INVENTION

1. Field of the Invention

The present invention relates to an optical information recording and/or reproducing apparatus for performing recording and reproduction of information on and from an optical information recording medium or for performing only reproduction of information, and more particularly to a method for detecting a tracking error signal. The optical information recording and/or reproducing apparatus of the present invention can be applied to those for performing recording and reproduction of information or for performing reproduction of information, for both optical information recording media with tracking guide grooves and optical information recording media without tracking guide grooves.

2. Related Background Art

With discs having no tracking guide groove but having a pit series, such as CDs (compact discs), a conventional method for detecting a tracking error signal of an optical head in an optical disc apparatus is one using three beams, for example as described in the book "Introduction to Video Discs and DAD" (first edition, Nov. 1, 1982) published by Kabushiki Kaisha Corona Sha. FIG. 1 shows spots on a disc, and error detecting sensors and a circuit system as described in the book.

In FIG. 1, a main spot SP1 and two subspots SP2 and SP3 are formed at equal intervals on the optical disc having pit series. The track pitch between pit series is P. The radial separation between the main spot SP1 and the subspot SP2 or SP3 is Q. Spots SP4, SP5, SP6 on sensors S1, S2, S3 correspond to the spots SP1, SP2, SP3, respectively, on the optical disc.

A tracking error signal TE0 is obtained as an output from a differential amplifier of S2 and S3 (the so-called three beam method). If the separation is changed to X (μm) between the center of the main spot SP1 and the center of the subspot SP2 (or subspot SP3) in the radial direction of disc (tracking direction), an output from S2 and an output from S3 can be approximated as follows with elementary functions, assuming that the average outputs thereof are equal to each other and equal to 1.

output from $S2 = 1 + \cos(kX - kQ)$ output from $S3 = 1 + \cos(kX + kQ)$, $k = 2\pi/P$ Thus, taking the difference between the above outputs as a tracking error signal TE0, the amplitude is proportional to $\sin(kQ)$. Since the tracking pitch P=1.6 μm for CDs etc., the absolute value of the amplitude can be illustrated as shown by 3Beam_1.6 (solid line) in FIG. 2.

Thus, this conventional example is arranged to maximize the signal amplitude of the tracking error signal TE0 by setting the separation Q between the center of spot and a track approximately to Q=0.4 μm from Q=P/4.

With discs having tracking guide grooves, such as magnetooptical discs, an example of a detection method using three beams is one described in Japanese Patent Publication No. 4-34212. FIG. 3 shows spots on a disc, and error detecting sensors and a circuit system as described in the publication.

In FIG. 3, a main spot SP1 and two subspots SP2 and SP3 are formed at equal intervals on an optical disc having alternate recording lands LD and guide grooves GR. The track pitch between grooves GR or between lands LD is P. A disc-radial separation between the center of the main spot SP1 and the center of the subspot SP2 or SP3 is Q. The spots SP4, SP5, SP6 on the sensors S1, S2, S3 correspond to the spots SP1, SP2, SP3, respectively, on the optical disc. The sensors S1, S2, S3 each have their partings corresponding to the track direction on the optical disc and are composed of segments SA1 and SB1, segments SA2 and SB2, and segments SA3 and SB3, respectively. Outputs from the segments in each sensor are guided through a differential amplifier to obtain a tracking error signal TE1, TE2, TE3. Further, a final tracking error signal TE is obtained through variable gain amplifiers G1, G2. Then the amplifier G1 is set to an intensity ratio of SP4 and SP5, and the amplifier G2 is set to an intensity ratio of SP5 and SP6, thereby obtaining a tracking error signal TE4 without a dc component. These can be expressed as follows by elementary function approximation. If the separation is changed to X (μm) between the center of the main spot SP1 and the center of the subspot SP2 (or subspot SP3) in the radial direction of disc, the tracking error signals TE1, TE2, TE3 can be expressed as follows, assuming that the amplitude for the main spot is 1 and the dc component is α at that time.

$TE1 = \sin(kX) + \alpha$ $TE2 = \{\sin(kX - kQ) + \alpha\}/G1$ $TE3 = \{\sin(kX + kQ) + \alpha\}/G1/G2$, $k = 2\pi/P$ Here, the final tracking error signal is obtained as follows.

$TE4 = TE1 - G1(TE2 + G2 \times TE3)$

Then the amplitude of the tracking error signal TE4 is proportional to $(1 - \cos(kQ))$.

Accordingly, this conventional example is arranged to maximize the signal amplitude of the tracking error signal TE4 by Q=P/2. FIG. 2 also shows the cases of P=1.6 μm, 1.39 μm, and 1.10 μm as DPP_1.6 (dotted line), DPP$_{13}$1.39 (chain line), and DPP_1.1 (thin solid line). (This method is called as a differential push-pull method, which will be referred to hereinafter as DPP.)

Incidentally, if a disc with grooves, for example arranged at the pitch of 1.6 μm, is reproduced using the system of FIG. 1 set as Q=0.4 μm, the amplitude of TE0 is little, about 0.5 as a relative value, as seen from FIG. 2. In contrast, if a disc without grooves, for example arranged at the pitch of 1.6 μm, is reproduced using the system of FIG. 3, the amplitude of TE4 becomes about the half of the maximum value thereof, as seen from FIG. 2.

There are the following problems as well.

The system of FIG. 1 is basically arranged to detect a change in the light quantity of reflected light of each spot while the system of FIG. 3 is basically arranged to detect a differential output TE1, TE2, TE3 (so to speak, a push-pull signal) of two segments for each spot. Simplifying it, the behaviors of the light-quantity change and the push-pull signal are different against the depth of groove or pit depth ϕ, as described, for example, in APPLIED OPTICS/1 Jul. 1978/Vol. 17, No. 13 "Simplified diffraction theory of the video disk." This shown in FIG. 4.

First considering CDs, the depth of pit is about 0.11 μm. Namely, assuming that the wavelength is 785 nm and the refractive index of substrate n=about 1.55, ϕ becomes nearly equal to 0.44 π (where π is a half-wave length). Accordingly, the light-quantity change becomes more than 90% of the maximum (when the depth of pit is λ/4n) of the light-quantity change in the three beam method. However, picking up a push-pull signal, it becomes about 40% of the maximum value of the tracking error signal in the push-pull method. Therefore, if tracking follow-up is carried out based on the push-pull signal with a disc consisting of a pit series, such as a CD, the system would entail instability to the follow-up operation.

On the other hand, considering a magnetooptical disc, the depth of groove φ is approximately equal to about 0.25π. Accordingly, the push-pull signal becomes a value nearly equal to the maximum value (when the depth of groove is λ/8n) of the tracking error signal in the push-pull method. In contrast, as to the light-quantity change, it becomes about 50% of the maximum value of the light-quantity change in the three beam method. Therefore, if the three beam method is employed for tracking follow-up with the magnetooptical disc, the system would entail instability with respect to the follow-up operation.

As described above, the conventional examples are arranged to meet either one of the cases, with and without grooves, which causes a problem that with an attempt to reproduce or to record and reproduce information with different types of optical discs, the system was incapable of obtaining a sufficient amplitude of the tracking error signal, thus resulting in instability of the follow-up operation in tracking follow-up.

SUMMARY OF THE INVENTION

The present invention has been developed taking account of the above problems in the conventional technology, and an object of the present invention is to provide an optical information reproducing apparatus or an optical information recording and/or reproducing apparatus capable of stably performing the tracking follow-up operation, irrespective of presence or absence of grooves.

To achieve the above object, an optical information recording and/or reproducing apparatus according to the present invention is an apparatus for recording and reproducing information or for reproducing information, which is arranged to form at least a main spot, a first subspot, and a second subspot on an optical information recording medium and to form spots, corresponding to the respective spots on the recording medium, on light-receiving elements associated with the respective spots, from reflected light of the three spots, wherein in performing tracking follow-up with a medium with tracking guide grooves, signals are taken after the light-receiving elements are located, with respect to the main spot or three spots out of the three spots, at positions where partings nearly perpendicular to the tracking direction bisect the respective spots on the light-receiving elements, thereby obtaining a tracking error signal, and with a medium without tracking guide grooves, a tracking error signal is obtained from the difference between an output from the light-receiving element associated with the first subspot and an output from the light-receiving element associated with the second subspot.

In the present invention, a sufficient amplitude of the tracking error signal is obtained irrespective of the presence or absence of grooves (guide grooves), thus assuring a stable tracking follow-up operation.

Another optical information recording and/or reproducing apparatus according to the present invention is an optical information recording and/or reproducing apparatus for recording and reproducing information or for reproducing information, provided with an optical head for obtaining information on an optical information recording medium by forming at least a main spot, a first subspot, and a second subspot on the optical information recording medium and focusing reflected light of the three spots on light-receiving elements corresponding to the respective spots, wherein the spot separation in a direction (radial direction of disc) perpendicular to the track direction between the main spot and the first or second subspot is changed by changing an angle of rotation of a diffraction grating for generating the three spots, depending upon the presence or absence of track guide grooves in the optical information recording medium.

The present invention involves an operation such that the light-receiving elements for tracking detection for media with tracking guide grooves (trenches) are different from those for media without tracking guide grooves, the separation between light spots on the optical disc, associated with the track spacing, is changed, depending upon the characteristics of the tracking error signal detected by the light-receiving elements, to obtain the tracking error signal at the maximum level, and the tracking control or tracking servo control is performed therewith.

Since the optical information recording and/or reproducing apparatus is so arranged that with a medium with tracking guide grooves, the tracking error signal is obtained from the light-receiving portion for the main spot having four light-receiving elements and the light-receiving portion for the subspots having two light-receiving elements arranged in symmetry in the track direction and that with the medium without tracking guide grooves, the tracking error signal is obtained from a light-receiving portion of the subspots having two light-receiving elements arranged in symmetry with the main spot in the track direction, the arrangement of changing the spot separation so as to match each of the media permits the tracking error signals to be obtained at the maximum level as an optical information recording and/or reproducing apparatus for recording and reproducing or for reproducing information with the two types of media.

DETAILED DESCRIPTION OF THE PREFERRED EMBODIMENTS

Specific embodiments of the present invention will be explained by reference to the drawings.

Figure 5:
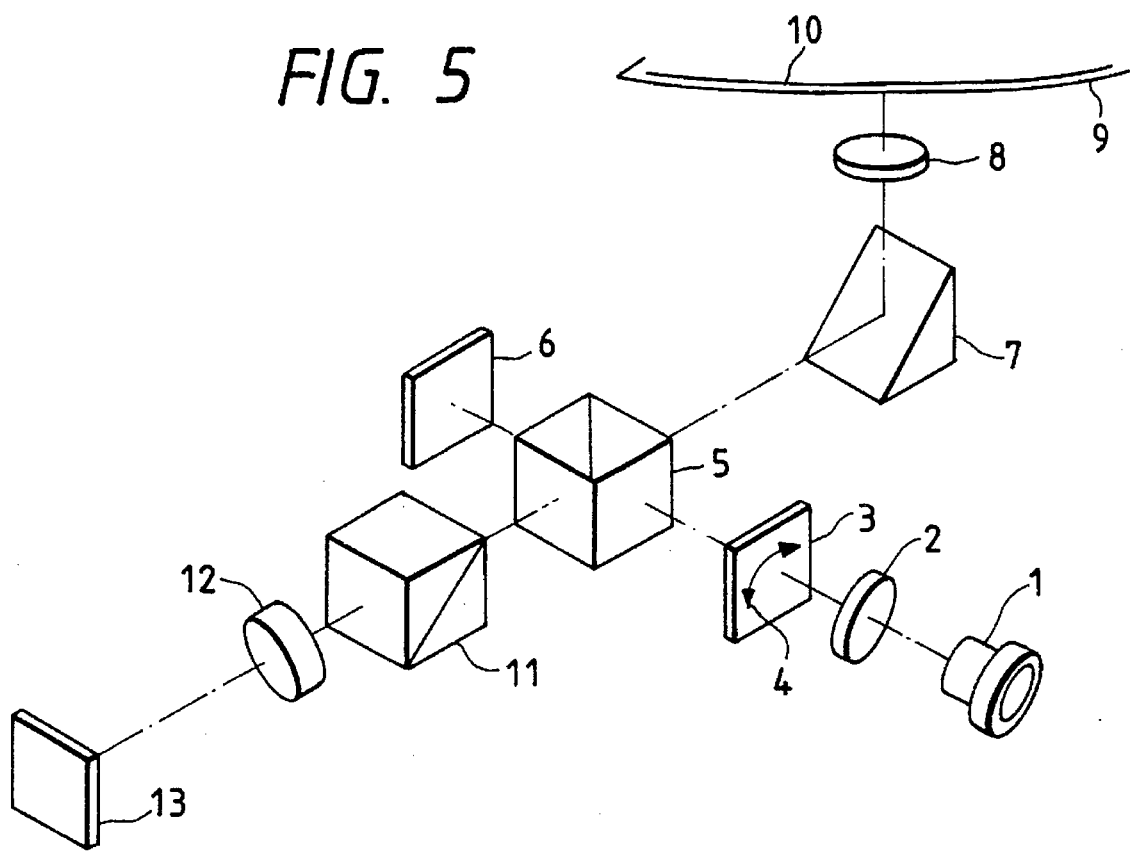
FIG. 5 is a structural drawing of an optical system used in an apparatus associated with a first embodiment according to the present invention.

FIG. 5 shows the schematic structure of an optical head used in an optical information recording and/or reproducing apparatus according to the present invention. In the drawing, a light beam emitted from a semiconductor laser 1 is collimated by a collimator lens 2, and the thus collimated light is split into three beams by a diffraction grating 3. These beams are partly reflected by a beam splitter 5, and the reflected beams are guided via a mirror 7 to be condensed by an objective 8 and to be focused near a track 10 on an optical disc 9. Light transmitted by the beam splitter 5 is changed into an electrical signal by a light-quantity monitoring sensor 6. Light reflected by the optical disc 9 is again collected by the objective 8 to be incident through the beam splitter 5 into a Wollaston prism 11. The Wollaston prism 11 splits the reflected light into a plurality of beams. The thus split beams are guided through a toric lens 12 for generating astigmatism onto a sensor 13 functioning to detect RF signals and to detect servo signals.

Figure 6:
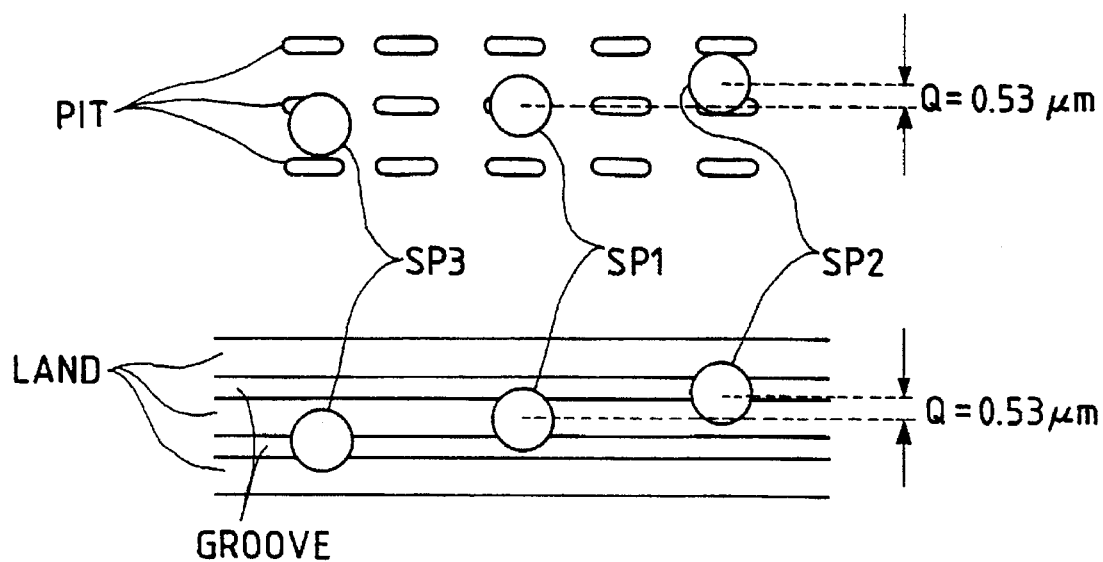
FIG. 6 is a conceptual drawing to the show states of spots on optical discs in the first embodiment according to the present invention.

In the present embodiment, the spots on the optical disc 9 are arranged as shown in FIG. 6 in the cases with and without track guide grooves. Specifically, the subspot SP2 and subspot SP3 are laid approximately on a same pit series or groove (or land) as the main spot SP1 is, and the separation Q in the radial direction of disc between the center of subspot SP2 or subspot SP3 and the center of the main spot SP1 is set to about 0.53 μm. The main spot SP1 is used to perform recording and reproduction of information or to perform reproduction of information.

This setting is effected by rotation 4 about the optical axis of the diffraction grating 3 in FIG. 5. Namely, the spot separation Q can be set to about 0.53 μm or in the range of 0.48 to 0.60 μm by increasing the angle of rotation of the diffraction grating 3.

The above setting value 0.53 μm was determined as follows.

Figure 1:
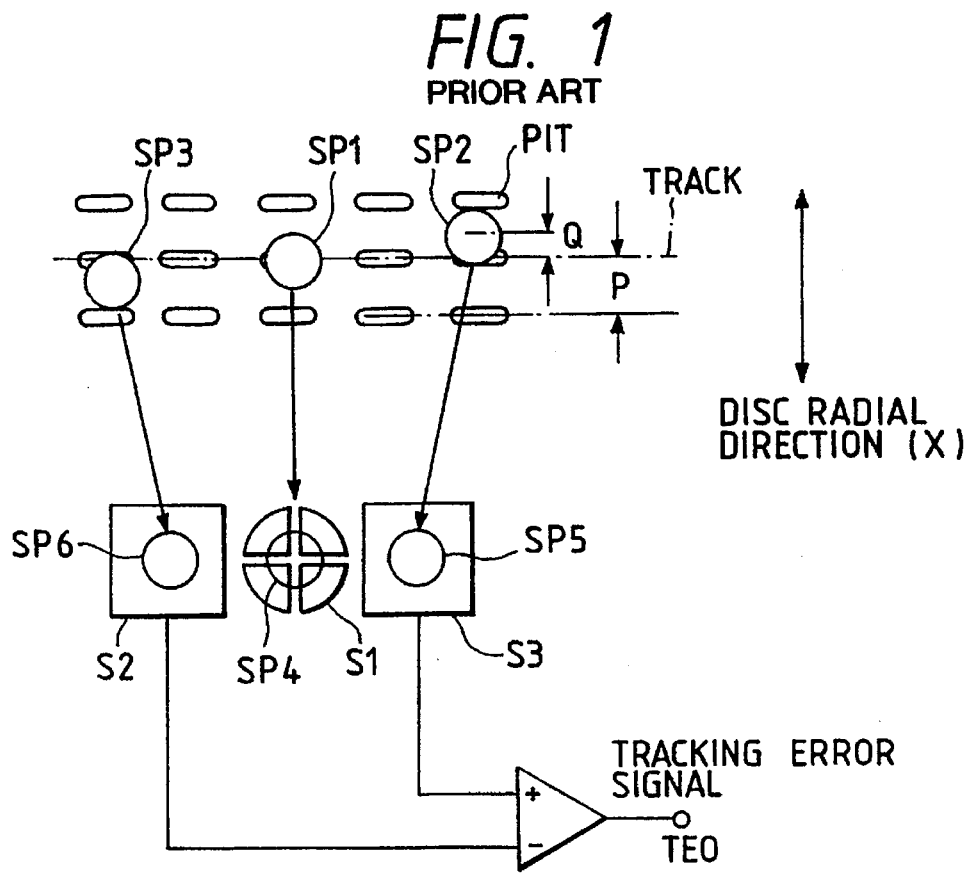
FIG. 1 is a drawing to show the state of spots on an optical disc without grooves and a detection circuit for detecting a tracking error in the conventional case.
Figure 2:
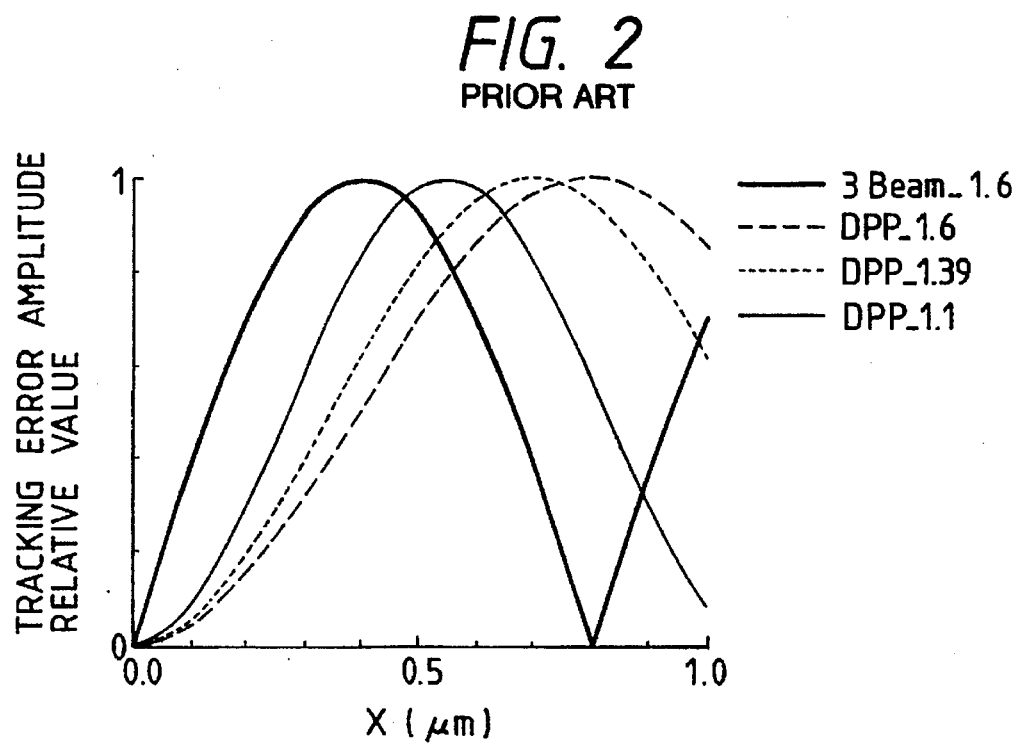
FIG. 2 is a graph to show a relationship between spot separation on the optical disc and the relative tracking error amplitude obtained.

In previous FIG. 2, the solid line represents the relationship between the separation X (μm) in the radial direction of disc between the center of the main spot SP1 and the center of the subspot SP2 (or subspot SP3) and the amplitude (relative value) of the tracking error signal obtained when the three beam method was applied to the optical disc of the track pitch 1.6 μm. Further, the dotted line represents the relationship between the separation X (μm) in the radial direction of disc between the center of the main spot SP1 and the center of the subspot SP2 (or subspot SP3) and the amplitude (relative value) of the tracking error signal obtained when DPP was applied to an optical disc of the tracking pitch 1.6 μm, and the chain line the relationship between the separation X (μm) in the radial direction of disc between the center of the main spot SP1 and the center of the subspot SP2 (or subspot SP3) and the amplitude (relative value) of the tracking error signal obtained when DPP was applied to an optical disc of the track pitch 1.39 μm. The track pitch 1.39 μm was chosen as the minimum track pitch of magnetooptical discs currently commercially available. Then an intersecting point between the solid line and the dotted line is about 0.56 μm while an intersecting point between the solid line and the chain line is 0.53 μm. Further, FIG. 2 also shows the case of the track pitch 1.10 μm (thin solid line), which is expected for media of next generation, and in that case the separation Q can be set to a further smaller value.

It is seen from FIG. 2 that with the discs of the respective track pitches for DPP, sufficient amplitudes of the tracking error signal can be obtained in either method of the three beam method and DPP by setting the separation X to near the intersecting point with the solid line.

The present embodiment employed 0.53 μm, considering, in addition to the above, that track pitches dominating at present and in near future were 1.6 μm and 1.39 μm and that higher accuracy of the tracking servo would be required with a decrease of track pitch. This setting value may be, however, selected in the range of 0.48 to 0.60 μm, which can secure 70 or more % of the maximum value of the tracking error signal obtained in either method of the three beam method and DPP even taking account the next generation media, thus obtaining a sufficient tracking error signal.

From the above considerations, a desired setting value may be selected in the range of 0.48 to 0.60 μm, and for the current track separation, it is preferably 0.53 μm.

Next explained is the detection of the tracking error signal.

Figure 7:
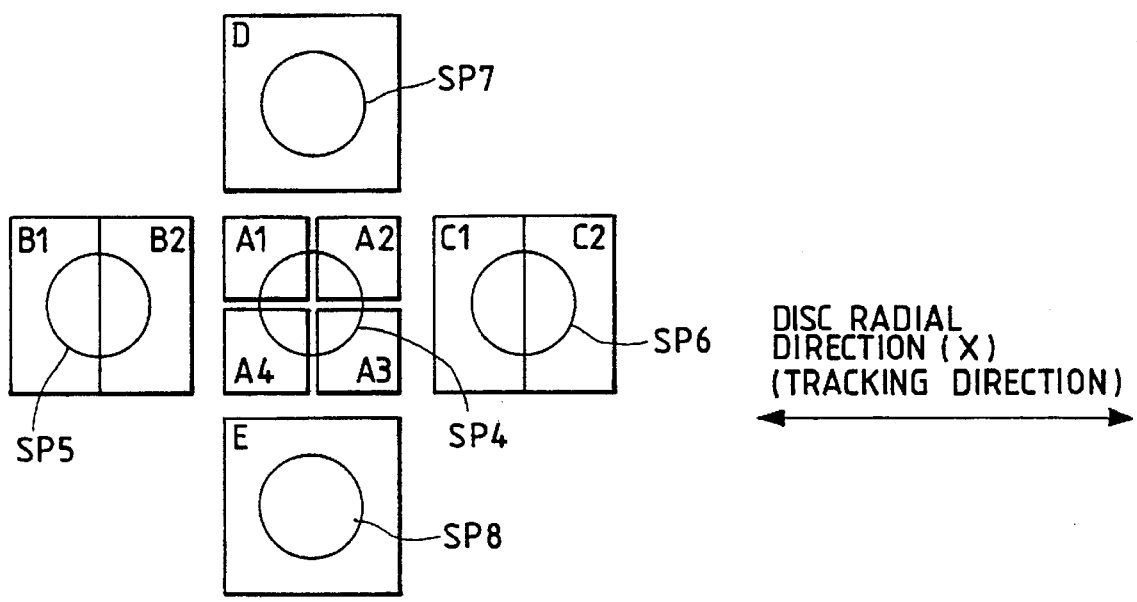
FIG. 7 is a conceptual drawing to show light-receiving elements in an optical head in each embodiment according to the present invention and spots on the light-receiving elements.

FIG. 7 shows the sensors of the present embodiment and the spots on the sensors. In FIG. 7, spots corresponding to the main spot SP1 are three spots SP4, SP7, SP8 separated by the Wollaston prism 11. Spot SP7 and spot SP8 have mutually orthogonal directions of polarization, and spot SP4 is a spot in which the two directions of polarization are mixed. Signals other than the tracking error signal are obtained as follows.

focus error signal in the astigmatic method=(A1+A3)−(A2+A4)

magnetooptical signal=D−E pit signal=D, E, D+E, A1+A2+A3+A4, or any combination from the preceding four signals.

The tracking error signal is obtained from a combination of spot SP5 and spot SP6 corresponding to the subspot SP2 and subspot SP3 with spot SP4 corresponding to the main spot SP1. The spot SP5 and spot SP6 are the same in terms of the direction of polarization as the spot SP4.

Figure 3:
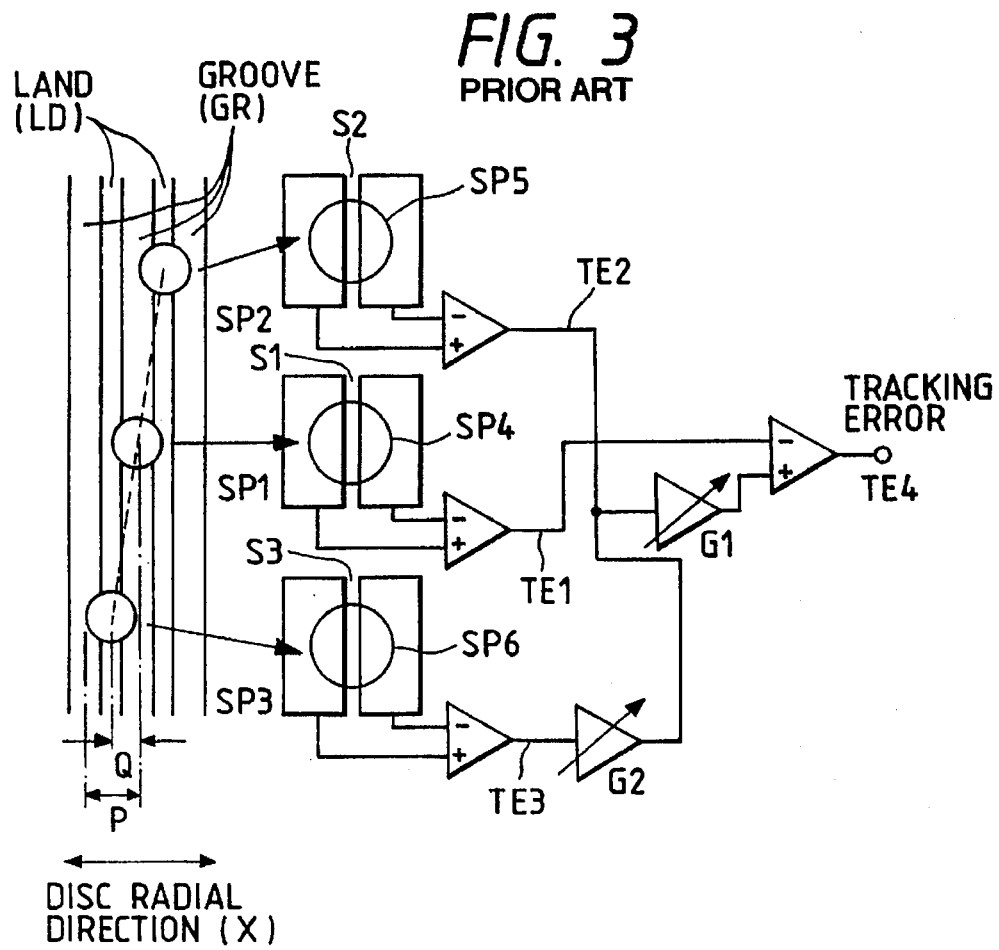
FIG. 3 is a drawing to show the state of spots on an optical disc with grooves and a detection circuit for detecting a tracking error.
Figure 4:
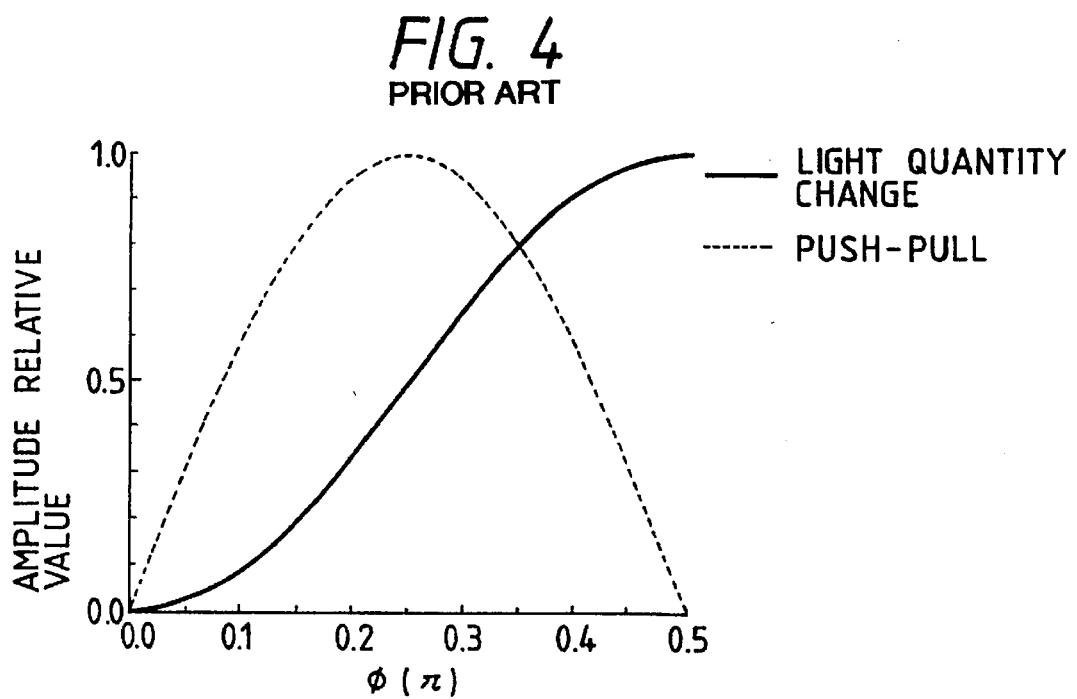
FIG. 4 is a graph to show the relationship between the depth of a pit or groove and the relative amplitude of the light-quantity change or an obtained push-pull signal.
Figure 8:
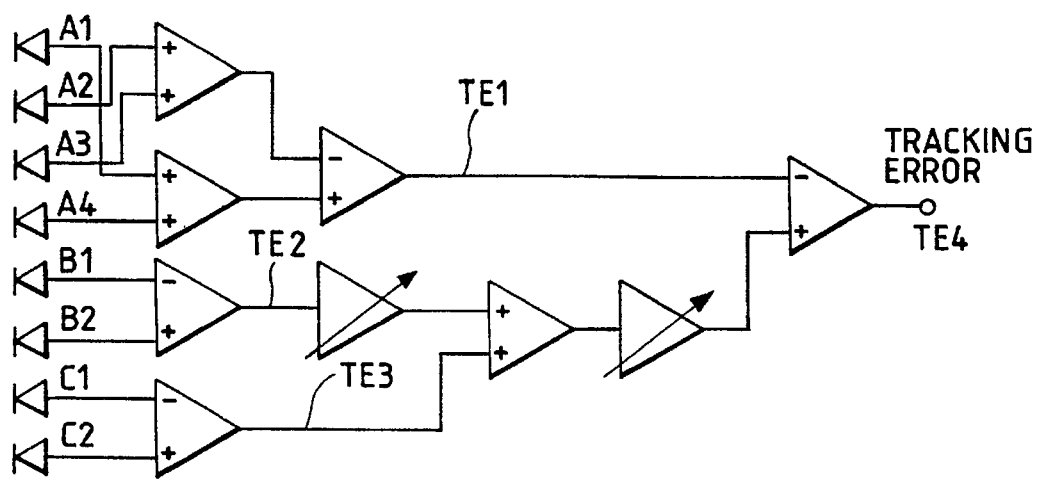
FIG. 8 is a circuit diagram to show a circuit for detecting a tracking error with a disc with grooves in the apparatus according to the present invention.

With an optical disc with grooves, the tracking error signal is obtained from a circuit system shown in FIG. 8. Describing it in comparison with the conventional example, signals corresponding to TE1, TE2, TE3 in previous FIG. 3 are given as follows.

TE1=(A1+A4)−(A2+A3)

TE2=B2−B1

TE3=C2−C1

Then matching gains, a final tracking error signal TE4 is obtained. Alternatively, TE1 may be employed as a final tracking error signal.

Figure 9:
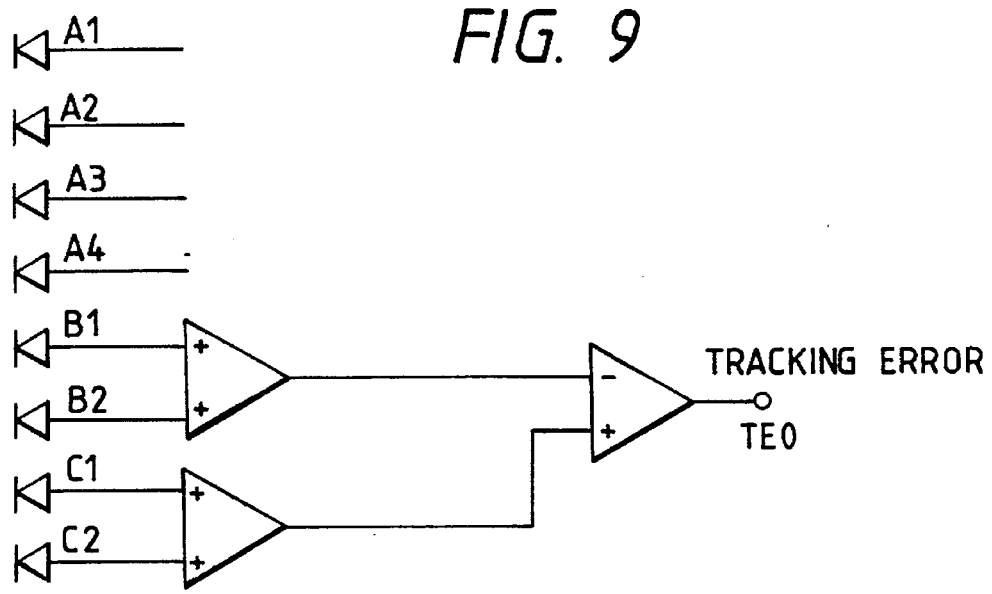
FIG. 9 is a circuit diagram to show a circuit for detecting a tracking error with a disc without grooves in the apparatus according to the present invention.

With an optical disc without grooves, the tracking error signal is obtained from a circuit system shown in FIG. 9. Namely, the tracking error signal is obtained as follows.

TE0=(C1+C2)–(B1+B2)

As described previously, the separation Q may be selected in the range of 0.48 to 0.60 μm, and for the current track separation, it is preferably 0.53 μm to obtain the tracking error signal at a high level.

In the first embodiment as described above, a determination of whether an optical disc has grooves or not is made using the outputs from the light-receiving element associated with the main spot SP1. Namely, the reflectivity of recording media without grooves such as CDs are high, about 80%, while those of recording media with grooves such as magnetooptical discs, are low, about 20%. Thus, a determination of whether a recording medium has grooves or not is made by detecting such a difference between the reflectivities from the difference between quantities of reflected light.

Figure 10:
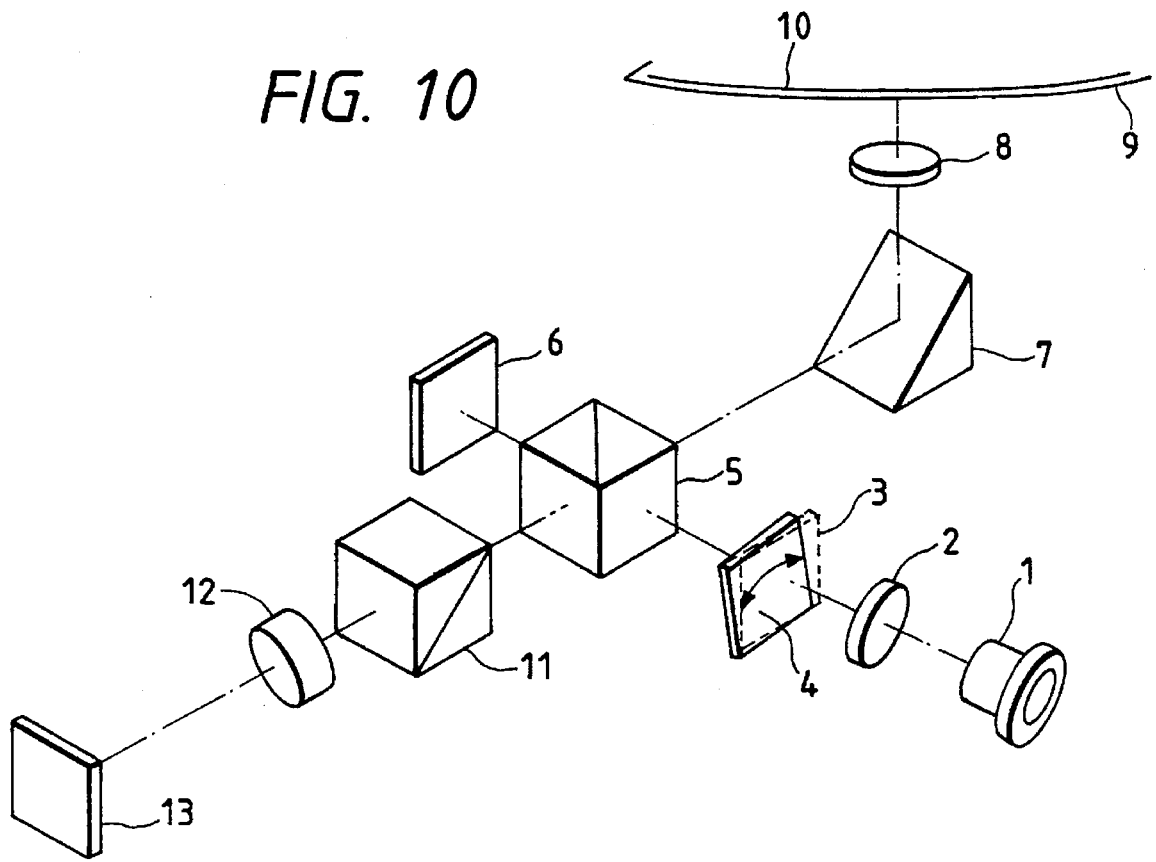
FIG. 10 is a structural drawing of an optical system used in an apparatus associated with a second embodiment according to the present invention.

The second embodiment is next explained. FIG. 10 shows the schematic structure of an optical head used in an optical information recording and/or reproducing apparatus according to the present invention. In FIG. 10, a light beam emitted from the semiconductor laser 1 is collimated by the collimator lens 2, and the thus collimated light is split into three beams by the diffraction grating 3. These beams are partly reflected by the beam splitter 5, and the reflected beams are guided via the mirror 7 to be condensed by the objective 8 and to be focused near a track 10 on the optical disc 9. Light transmitted by the beam splitter 5 is changed into an electrical signal by a light-quantity monitoring sensor 6. Light reflected by the optical disc 9 is again collected by the objective 8 to be incident through the beam splitter 5 into the Wollaston prism 11. The Wollaston prism 11 splits the reflected light into a plurality of beams. The thus split beams are guided through the toric lens 12 for generating astigmatism onto the sensor 13 functioning to detect RF signals and to detect servo signals.

Figure 11:
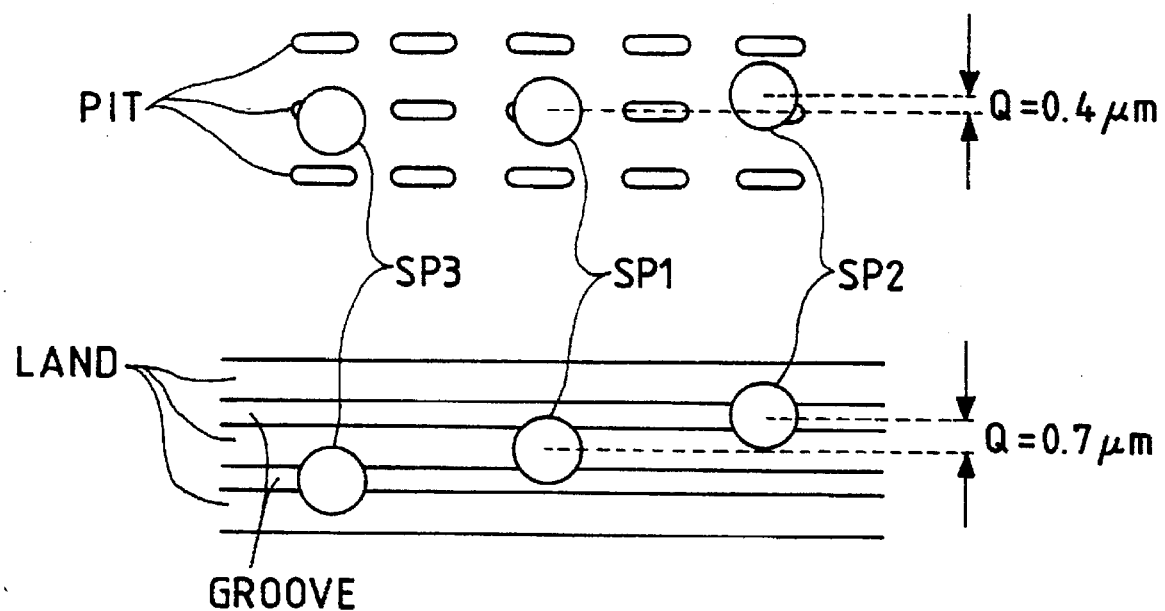
FIG. 11 is a conceptual drawing to show the states of spots on optical discs in the second embodiment according to the present invention.

In the second embodiment, the spots on the optical disc 9 are arranged as shown in FIG. 11. Specifically, the subspot SP2 and subspot SP3 are laid approximately on a same pit series or groove (or land) as the main spot SP1 is, and the separation Q in the radial direction of disc between the center of subspot SP2 or SP3 and the center of the main spot is set to 0.4 μm with a disc without grooves, while to about 0.7 μm with a disc with grooves. Then the main spot SP1 is used to perform recording and reproduction of information or to perform reproduction of information.

This setting is effected by rotation 4 about the optical axis of the diffraction grating 3 in FIG. 5, and the present second embodiment is so arranged, similarly as the first embodiment, that when the determination of whether there are grooves or not is made from the output from the sensor 13, a value of rotation 4 is mechanically switched between two locations indicated by the solid lines and the dotted lines, as shown in FIG. 10, for the location of the diffraction grating 3, thereby automatically switching the separation between spots as determining the type of disc from the output from sensor 13.

Among the above setting values, Q=0.7 μm was determined as follows. Namely, the track pitches dominating at present or in the near future are 1.6 μm and 1.39 μm, and even taking account media of the next generation, the track pitch will be about 1.1 μm. Thus, the setting value may be selected in the range of 0.55 to 0.8 μm if there are grooves. Further, the setting value is preferably about 0.7 μm for any track pitch, which can secure the amplitude of tracking error more than 90% of the maximum value of the tracking error signal obtained in the push-pull method. Therefore, the present second embodiment employed the above value.

Next explained is detection of the tracking error signal.

The present second embodiment also involves the sensors and the spots on the sensors as shown in FIG. 7. In FIG. 7, spots corresponding to the main spot SP1 are three spots SP4, SP7, SP8 separated by the Wollaston prism 11. Spot SP7 and spot SP8 have mutually orthogonal directions of polarization, and spot SP4 is a spot in which the two directions of polarization are mixed. Signals other than the tracking error signal are obtained as follows.

focus error signal in the astigmatic method=(A1+A3)–(A2+A4)

magnetooptical signal=D–E pit signal=D, E, D+E, A1+A2+A3+A4, or any combination from the preceding four signals.

The tracking error signal is obtained from a combination of spot SP5 and spot SP6 corresponding to the subspot SP2 and subspot SP3 with spot SP4 corresponding to the main spot SP1. The spot SP5 and spot SP6 are the same in terms of the direction of polarization as the spot SP4.

When an optical disc is determined to have grooves, the tracking error signal is obtained from the circuit system shown in previous FIG. 8. Describing it in comparison with the conventional example, signals corresponding to TE1, TE2, TE3 in FIG. 3 are given as follows.

TE1=(A1+A4)–(A2+A3)

TE2=B2–B1

TE3=C2–C1

Then for matching gains, a final tracking error signal TE4 is obtained. Alternatively, TE1 may be employed as a final tracking error signal.

With an optical disc without grooves, the tracking error signal is obtained from the circuit system shown in FIG. 9. Namely, the tracking error signal is obtained as follows.

TE0=(C1+C2)–(B1+B2)

Since the present second embodiment provides almost the best conditions for the both types of discs with and without grooves, stabler tracking servo can be expected as compared with the first embodiment.

As explained above, the apparatus of the present invention is so arranged that if a medium has tracking guide grooves, the operation of tracking follow-up is carried out based on the tracking error signal obtained from the signals extracted from the light-receiving elements so as to bisect the spots on the light-receiving elements by respective partings nearly perpendicular to the tracking direction, for the main spot or three spots out of the three spots, and that if a medium has no tracking guide groove, the operation of tracking follow-up is carried out based on the tracking error signal obtained from a difference between the output from the light-receiving element corresponding to the first subspot and the output from the light-receiving element corresponding to the second subspot, whereby a apparatus can obtain the sufficient amplitude of the tracking error signal, irrespective of the presence or absence of grooves, thereby being capable of stably performing the tracking follow-up operation.

Further, the separation between the spots in the direction (radial direction of disk) perpendicular to the track direction is set to the predetermined value in accordance with each of the types of recording media, whereby the apparatus can obtain the tracking error signal at a high level.

What is claimed is:

1. A detecting apparatus for detecting a tracking error signal in an optical information recording and/or reproducing apparatus, comprising:

spot forming means for forming three spots comprising a main spot, a first subspot, and a second subspot on an optical information recording medium, wherein on the optical information recording medium said first subspot and said second subspot are formed at equal intervals on either side of said main spot, wherein the separation in a direction perpendicular to a track direction between the center of said main spot and the center of said first subspot on said optical information recording medium and the separation in the direction perpendicular to the track direction between the center of said main spot and the center of said second subspot on said optical information recording medium are set to be between 0.48 μm and 0.60 μm;

light-receiving means for receiving reflected light from the three spots of said main spot, said first subspot, and said second subspot, said light-receiving means having light-receiving elements corresponding to the respective spots;

first detecting means for detecting a tracking error signal, using an output from the light-receiving element corresponding to said main spot or using outputs from the light-receiving elements corresponding to the three spots of said main spot, said first subspot, and said second subspot, if there is a tracking guide groove in said optical information recording medium; and second detecting means for detecting a tracking error signal, using an output from the light-receiving element corresponding to said first subspot and an output from the light-receiving element corresponding to said second subspot, if there is no tracking guide groove in said optical information recording medium.

2. The apparatus according to claim 1, wherein each of said light-receiving elements has a first segment and a second segment separated by a parting substantially perpendicular to a tracking direction.

3. The apparatus according to claim 2, wherein said first detecting means detects the tracking error signal from a difference between an output from said first segment and an output from said second segment.

4. The apparatus according to claim 1, wherein said second detecting means detects the tracking error signal from a difference between the output from the light-receiving element corresponding to said first subspot and the output from the light-receiving element corresponding to said second subspot.

5. A detecting apparatus for detecting a tracking error signal in an optical information recording and/or reproducing apparatus, comprising:

spot forming means for forming three spots of a main spot, a first subspot, and a second subspot on an optical information recording medium;

light-receiving means for receiving reflected light from the three spots of said main spot, said first subspot, and said second subspot, said light-receiving means having light-receiving elements corresponding to the respective spots;

first detecting means for detecting a tracking error signal, using an output from the light-receiving element corresponding to said main spot or using outputs from the light-receiving elements corresponding to the three spots of said main spot, said first subspot, and said second subspot, if there is a tracking guide groove in said optical information recording medium;

second detecting means for detecting a tracking error signal, using an output from the light-receiving element corresponding to said first subspot and an output from the light-receiving element corresponding to said second subspot, if there is no tracking guide groove in said optical information recording medium;

determining means for determining whether there is a tracking guide groove in said optical information recording medium; and changing means for changing the separation in a direction perpendicular to the track direction between the center of said main spot and the center of said first subspot or said second subspot on said optical information recording medium, based on a result of determination by said determining means, wherein said changing means changes the separation in the direction perpendicular to the track direction between the center of said main spot and the center of said first subspot or said second subspot on said optical information recording medium to about 0.4 μm if there is no tracking guide groove in said optical information recording medium and changes the separation in the direction perpendicular to the track direction between the center of said main spot and the center of said first subspot or said second subspot on said optical information recording medium to an arbitrary value between 0.55 μm and 0.8 μm if there is a tracking guide groove in said optical information recording medium.

6. An optical information recording and/or reproducing apparatus comprising:

spot forming means for forming three spots of a main spot, a first subspot, and a second subspot on an optical information recording medium in order to perform recording and/or reproduction of information;

light-receiving means for receiving reflected light from the three spots of said main spot, said first subspot, and said second subspot, said light-receiving means having light-receiving elements corresponding to the respective spots;

determining means for determining whether there is a tracking guide groove in said optical information recording medium;

changing means for changing a separation in a direction perpendicular to a track direction between the center of said main spot and the center of said second subspot on said optical information recording medium, based on a result of a determination by said determining means, wherein said changing means changes the separation in the direction perpendicular to the track direction between the center of said main spot and the center of said second subspot on said optical information recording medium to about 0.4 μm if there is no tracking guide groove in said optical information recording medium and changes the separation in the direction perpendicular to the track direction between the center of said main spot and the center of said second subspot on said optical information recording medium to an arbitrary value between 0.55 μm and 0.8 μm if there is a tracking guide groove in said optical information recording medium.

7. The apparatus according to claim 6, wherein said spot forming means comprises a semiconductor laser and a diffraction grating for splitting a light beam from said semiconductor laser into three light beams.

8. The apparatus according to claim 7, wherein said changing means changes an angle of rotation of said diffraction grating.

* * * * *

UNITED STATES PATENT AND TRADEMARK OFFICE
CERTIFICATE OF CORRECTION

PATENT NO. : 5,671,199
DATED : September 23, 1997
INVENTOR(S) : KOICHIRO NISHIKAWA It is certified that error appears in the above-identified patent and that said Letters Patent is hereby corrected as shown below:

ON THE COVER PAGE

At [73], ASSIGNEE

Line 1, "Kaishi," should read --Kaisha--.

COLUMN 2

Line 41, "$DPP_{13}1.39$" should read --$DPP\_1.39$--.
    Line 43, "as" should be deleted.
    Line 51, "the" (first occurrence) should be deleted.
    Line 55, "of" (first occurrence) should read --of the--.
    Line 63, "This" should read --This is--.
    Line 64, "$\mu m$" should read --$\mu m.$--.
    Line 65, ".Namely," should read --Namely,--.

COLUMN 4

Line 48, "show a" should read --show the--.

COLUMN 5

Line 67, "the" (second occurrence) should read --represents the--.

COLUMN 6

Line 11, "next" should read --the next--.
    Line 26, "70 or more %" should read --70% or more--.
    Line 28, "account" should read --into account--.

UNITED STATES PATENT AND TRADEMARK OFFICE
CERTIFICATE OF CORRECTION

PATENT NO. : 5,671,199
DATED : September 23, 1997
INVENTOR(S) : KOICHIRO NISHIKAWA It is certified that error appears in the above-identified patent and that said Letters Patent is hereby corrected as shown below:

COLUMN 7

Line 11, "grooves" should read --grooves,--.
    Line 60, "media" should read --of media--.
    Line 67, "employed" should read --employs--.

COLUMN 8

Line 52, "a" should read --the--.
    Line 53, "the" should read --a--.

Signed and Sealed this

Thirty-first Day of March, 1998

Attest:

BRUCE LEHMAN

*Attesting Officer*    *Commissioner of Patents and Trademarks*